(12) United States Patent
Lin et al.

(10) Patent No.: US 9,733,485 B2
(45) Date of Patent: Aug. 15, 2017

(54) COLLIMATING LENS

(71) Applicant: HIMAX TECHNOLOGIES LIMITED, Tainan (TW)

(72) Inventors: Han-Ching Lin, Tainan (TW); Yin Dong Lu, Tainan (TW); Han Yi Kuo, Tainan (TW)

(73) Assignee: Himax Technologies Limited, Tainan (TW)

( * ) Notice: Subject to any disclaimer, the term of this patent is extended or adjusted under 35 U.S.C. 154(b) by 49 days.

(21) Appl. No.: 14/929,221

(22) Filed: Oct. 30, 2015

(65) Prior Publication Data

US 2017/0123223 A1    May 4, 2017

(51) Int. Cl.
| | | |
|---|---|---|
| *G02B 27/30* | (2006.01) | |
| *G02B 27/42* | (2006.01) | |
| *G02B 13/18* | (2006.01) | |
| *G02B 9/64* | (2006.01) | |
| *G02B 5/18* | (2006.01) | |

(52) U.S. Cl.
CPC ........... *G02B 27/30* (2013.01); *G02B 5/1876* (2013.01); *G02B 9/64* (2013.01); *G02B 13/18* (2013.01); *G02B 27/4233* (2013.01)

(58) Field of Classification Search
CPC .. G02B 5/189; G02B 26/124; G02B 27/0037; G02B 5/30; G02B 5/1876
USPC ........................................ 359/641, 565, 566
See application file for complete search history.

(56) References Cited

U.S. PATENT DOCUMENTS

| | | | |
|---|---|---|---|
| 5,058,981 A | 10/1991 | Umegaki et al. | |
| 5,818,632 A * | 10/1998 | Stephenson | G02B 5/189 356/513 |
| 6,014,262 A * | 1/2000 | Noda | G02B 26/124 359/205.1 |
| 6,266,191 B1 * | 7/2001 | Abe | G02B 27/0037 359/565 |
| 6,324,013 B1 | 11/2001 | Nakai | |
| 6,688,758 B2 | 2/2004 | Thibault | |
| 6,967,777 B2 * | 11/2005 | Hirai | G02B 27/0944 219/121.61 |
| 2002/0012157 A1 | 1/2002 | Feldman et al. | |
| 2006/0262416 A1 | 11/2006 | Lee et al. | |
| 2007/0275505 A1 | 11/2007 | Wolterink et al. | |
| 2011/0001865 A1 | 1/2011 | Hirao et al. | |
| 2015/0062404 A1 | 3/2015 | Lu et al. | |

FOREIGN PATENT DOCUMENTS

| | | |
|---|---|---|
| JP | 62-141511 | 6/1987 |
| JP | 62-175938 | 8/1987 |
| JP | 62-237413 | 10/1987 |
| JP | 08-114767 | 5/1996 |

(Continued)

OTHER PUBLICATIONS

European Search Report dated Apr. 14, 2016 in corresponding European Application No. 15192608.6.

(Continued)

*Primary Examiner* — Audrey Y Chang
(74) *Attorney, Agent, or Firm* — Donald E. Stout; Stout, Uxa & Buyan, LLP

(57) ABSTRACT

A collimating lens includes at least two lens groups, each having an aspherical surface. The collimating lens also includes a flat diffraction lens disposed nearest to an image plane.

11 Claims, 3 Drawing Sheets

(56) References Cited

FOREIGN PATENT DOCUMENTS

| | | |
|---|---|---|
| JP | 08-220480 | 8/1996 |
| JP | 2001-281604 | 10/2001 |
| JP | 2005-084359 | 3/2005 |
| JP | 2011-141429 | 7/2011 |
| TW | 126706 | 1/1990 |
| TW | 201115204 A | 5/2011 |

OTHER PUBLICATIONS

Office Action Dated Jan. 31, 2017 in corresponding Japanese Patent Application No. 2016-001817.
Office Action Dated Dec. 20, 2016 in corresponding Taiwan Patent Application No. 104138354.

\* cited by examiner

COLLIMATING LENS

BACKGROUND OF THE INVENTION

1. Field of the Invention

The present invention generally relates to a collimating lens, and more particularly to a collimating lens with a diffraction lens.

2. Description of Related Art

A collimating lens is an optical device that aligns light beams in a specific direction to make collimated light or parallel rays. Accordingly, light does not disperse with distance, or at least, will disperse minimally. The collimating lens may be used with a light source such as a laser diode.

A conventional collimating lens may consist of a mould-made curved lens composed of glass. As a result, cost is high and overall dimension is large. Moreover, the conventional collimating lens possesses at least one convex surface, which makes assembling the collimating lens difficult.

For the foregoing reasons, a need has arisen to propose a novel collimating lens to eliminate drawbacks of the conventional collimating lens.

SUMMARY OF THE INVENTION

In view of the foregoing, it is an object of the embodiment of the present invention to provide a collimating lens with compact dimension at low cost to facilitate the assembly of the collimating lens.

According to one embodiment, a collimating lens includes at least two lens groups, each having an aspherical surface. The collimating lens includes a flat diffraction lens disposed nearest to an image plane. The collimating lens of one embodiment possesses no convex outer surface.

DETAILED DESCRIPTION OF THE INVENTION

Figure 1A:
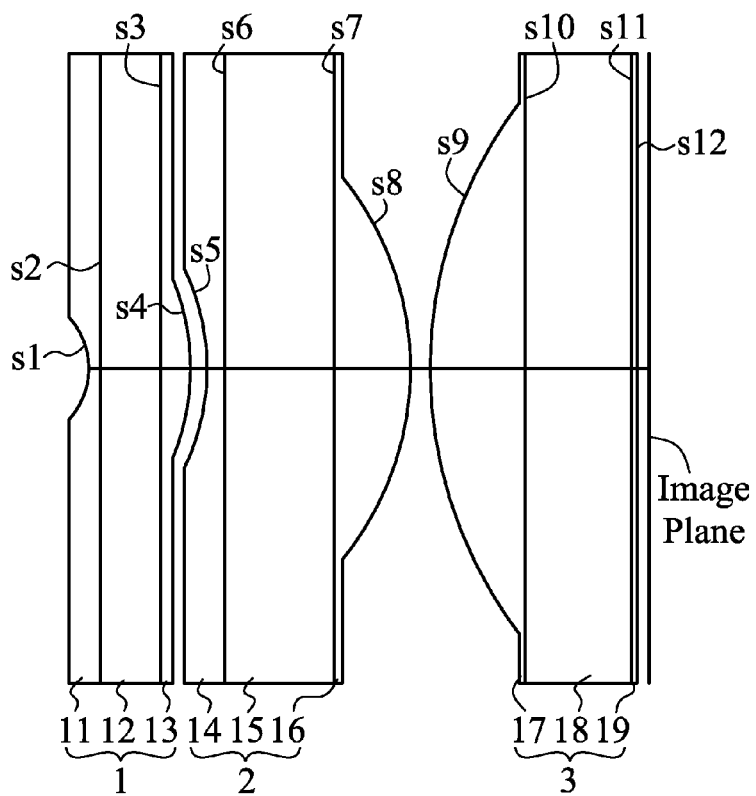
FIG. 1A shows a lens arrangement of a collimating lens according to a first embodiment of the present invention.
Figure 1B:
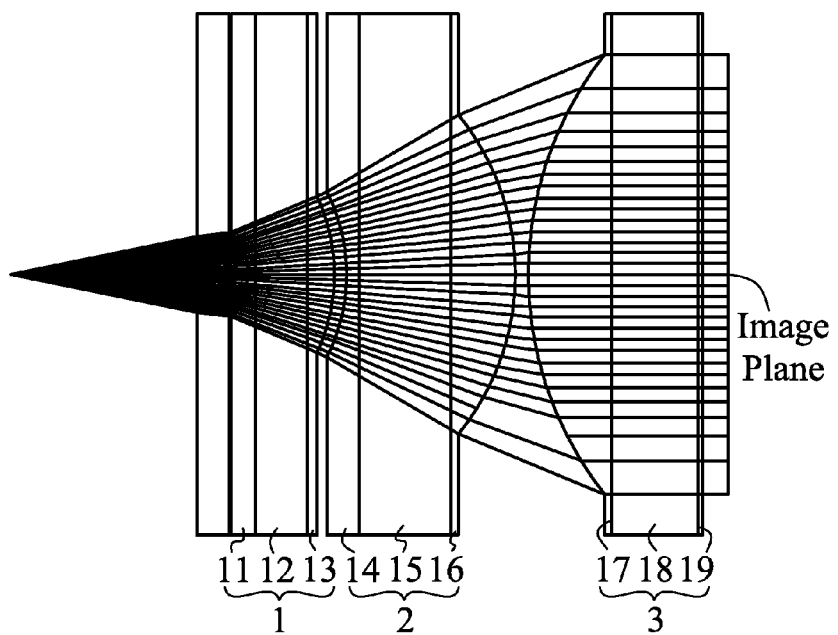
FIG. 1B shows an exemplary ray diagram of FIG. 1A.

FIG. 1A shows a lens arrangement of a collimating lens 100 according to a first embodiment of the present invention, and FIG. 1B shows an exemplary ray diagram of FIG. 1A. The collimating lens 100 of the first embodiment and collimating lenses of other embodiments as described in the specification may be preferably fabricated by wafer-level optics (WLO) technique. The collimating lens 100 of the first embodiment and collimating lenses of other embodiments as described in the specification may be composed of a transparent material such as glass or plastic. In the drawing, the left-hand side of the collimating lens 100 faces an object, and the right-hand side of the collimating lens 100 faces an image plane.

In the first embodiment, the collimating lens 100 may include a first lens group 1, a second lens group 2 and a third lens group 3 in the order from the object side to the image side. Specifically, the first lens group 1 may include, in the order from the object side to the image side, a negative-powered first lens 11 (that is, a lens with negative refractive power), a flat second lens 12 (that is, a lens with a planar object-side surface and a planar image-side surface), and a positive-powered third lens 13 (that is, a lens with positive refractive power). To be more specific, the negative-powered first lens 11 has an aspherical concave object-side surface s1 (with a negative radius) and a planar image-side surface s2. The flat second lens 12 has a planar object-side surface s2 and a planar image-side surface s3. The positive-powered third lens 13 has a planar object-side surface s3 and an aspherical convex image-side surface s4. In the embodiment, the negative-powered first lens 11 is in substantially contact with the flat second lens 12, which is further in substantially contact with the positive-powered third lens 13.

The second lens group 2 may include, in the order from the object side to the image side, a negative-powered fourth lens 14, a flat fifth lens 15, and a positive-powered sixth lens 16. To be more specific, the negative-powered fourth lens 14 has an aspherical concave object-side surface s5 (with a negative radius) and a planar image-side surface s6. The flat fifth lens 15 has a planar object-side surface s6 and a planar image-side surface s7. The positive-powered sixth lens 16 has a planar object-side surface s7 and an aspherical convex image-side surface s8. In the embodiment, the negative-powered fourth lens 14 is in substantially contact with the flat fifth lens 15, which is further in substantially contact with the positive-powered sixth lens 16.

The third lens group 3 may include, in the order from the object side to the image side, a positive-powered seventh lens 17, a flat eighth lens 18, and a flat diffraction ninth lens 19. To be more specific, the positive-powered seventh lens 17 has an aspherical convex object-side surface s9 (with a positive radius) and a planar image-side surface s10. The flat eighth lens 18 has a planar object-side surface s10 and a planar image-side surface s11. The flat diffraction ninth lens 19 has a planar object-side surface s11 and a planar image-side surface s12. In the embodiment, the positive-powered seventh lens 17 is in substantially contact with the flat eighth lens 18, which is further in substantially contact with the flat diffraction ninth lens 19.

Generally speaking, the collimating lens 100 of the embodiment has at least two aspherical surfaces, one of which has a positive radius and the other of which has a negative radius. For example, the collimating lens 100 has the aspherical concave object-side surface s1 with a negative radius and the aspherical convex object-side surface s9 with a positive radius.

According to one aspect of the embodiment, the negative-powered first lens 11, the positive-powered third lens 13, the negative-powered fourth lens 14, the positive-powered sixth lens 16, the positive-powered seventh lens 17 and the flat diffraction ninth lens 19 have a refractive index ranging between 1.5 and 1.6, and have an Abbe number ranging between 31 and 48.

According to another aspect of the embodiment, the flat second lens 12, the flat fifth lens 15 and the flat eighth lens 18 have a refractive index ranging between 1.5 and 1.6, and have an Abbe number ranging between 45 and 65.

Figure 2A:
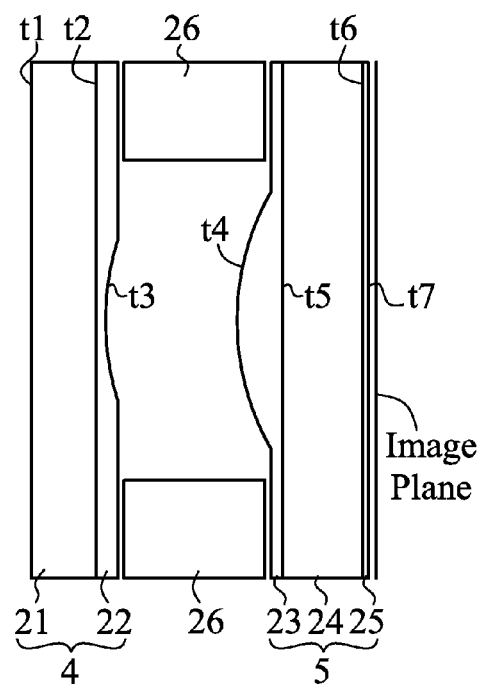
FIG. 2A shows a lens arrangement of a collimating lens according to a second embodiment of the present invention.
Figure 2B:
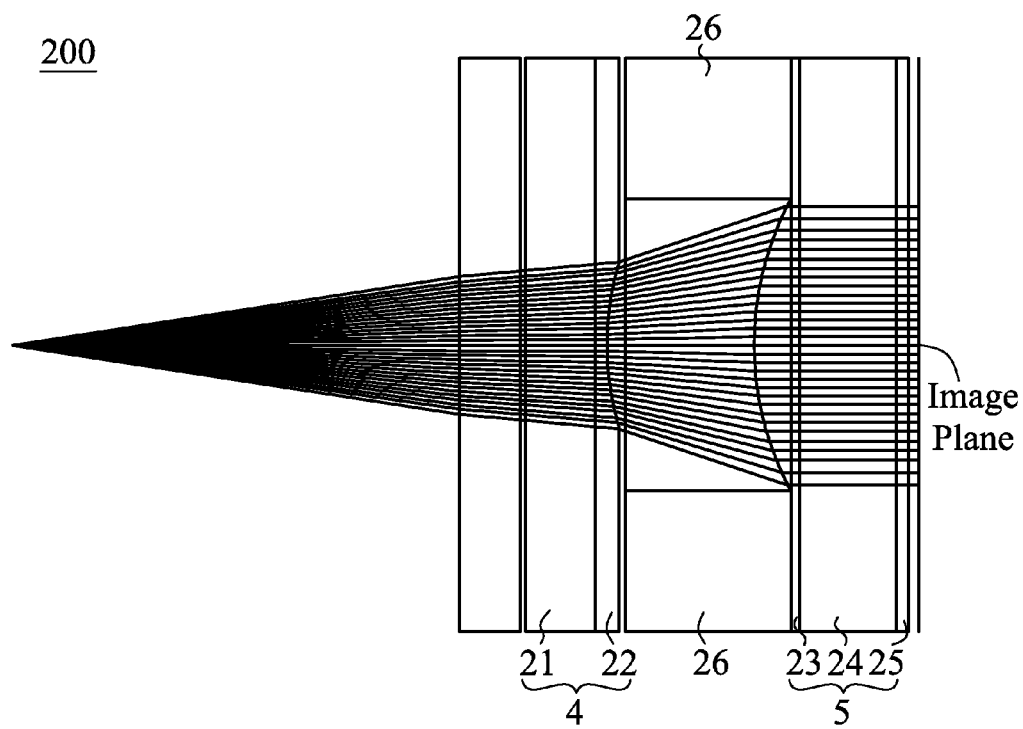
FIG. 2B shows an exemplary ray diagram of FIG. 2A.

FIG. 2A shows a lens arrangement of a collimating lens 200 according to a second embodiment of the present invention, and FIG. 2B shows an exemplary ray diagram of FIG. 2A.

In the second embodiment, the collimating lens 200 may include a first lens group 4 and a second lens group 5 in the order from the object side to the image side. Specifically, the first lens group 4 may include, in the order from the object side to the image side, a flat first lens 21 and a negative-powered second lens 22. To be more specific, the flat first lens 21 has a planar object-side surface t1 and a planar image-side surface t2. The negative-powered second lens 22 has a planar object-side surface t2 and an aspherical concave image-side surface t3 (with a negative radius). In the embodiment, the flat first lens 21 is in substantially contact with the negative-powered second lens 22.

The second lens group 5 may include, in the order from the object side to the image side, a positive-powered third lens 23, a flat fourth lens 24, and a flat diffraction fifth lens 25. To be more specific, the positive-powered third lens 23 has an aspherical convex object-side surface t4 (with a positive radius) and a planar image-side surface t5. The flat fourth lens 24 has a planar object-side surface t5 and a planar image-side surface t6. The flat diffraction fifth lens 25 has a planar object-side surface t6 and a planar image-side surface t7. In the embodiment, the positive-powered third lens 23 is in substantially contact with the flat fourth lens 24, which is further in substantially contact with the flat diffraction fifth lens 25.

The collimating lens 200 of the second embodiment may further include a ring spacer 26, which is disposed between and in contact with peripheries of the first lens group 4 and the second lens group 5, such that the first lens group 4 may be coupled with the second lend group 5.

Generally speaking, the collimating lens 200 of the embodiment has at least two aspherical surfaces, one of which has a positive radius and the other of which has a negative radius. For example, the collimating lens 200 has the aspherical concave image-side surface t3 with a negative radius and the aspherical convex object-side surface t4 with a positive radius.

According to one aspect of the embodiment, the negative-powered second lens 22, the positive-powered third lens 23 and the flat diffraction fifth lens 25 have a refractive index ranging between 1.5 and 1.6, and have an Abbe number ranging between 31 and 48.

According to another aspect of the embodiment, the flat first lens 21 and the flat fourth lens 24 have a refractive index ranging between 1.5 and 1.6, and have an Abbe number ranging between 45 and 65.

Figure 3A:
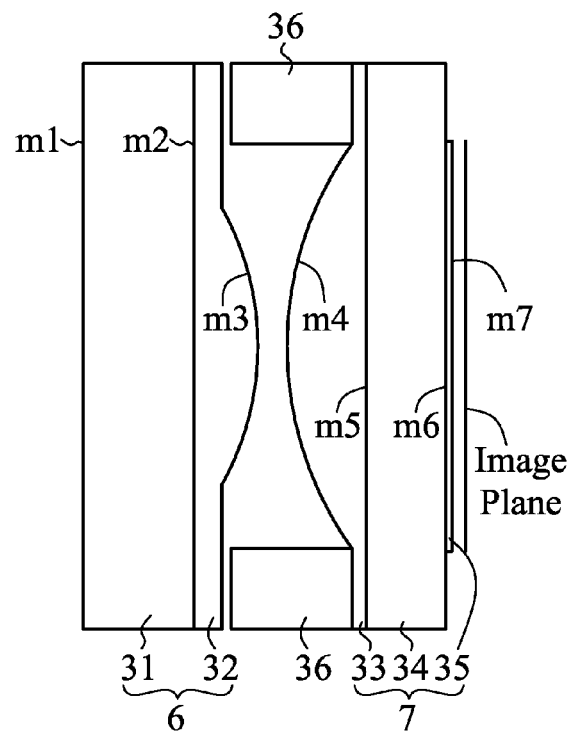
FIG. 3A shows a lens arrangement of a collimating lens according to a third embodiment of the present invention.
Figure 3B:
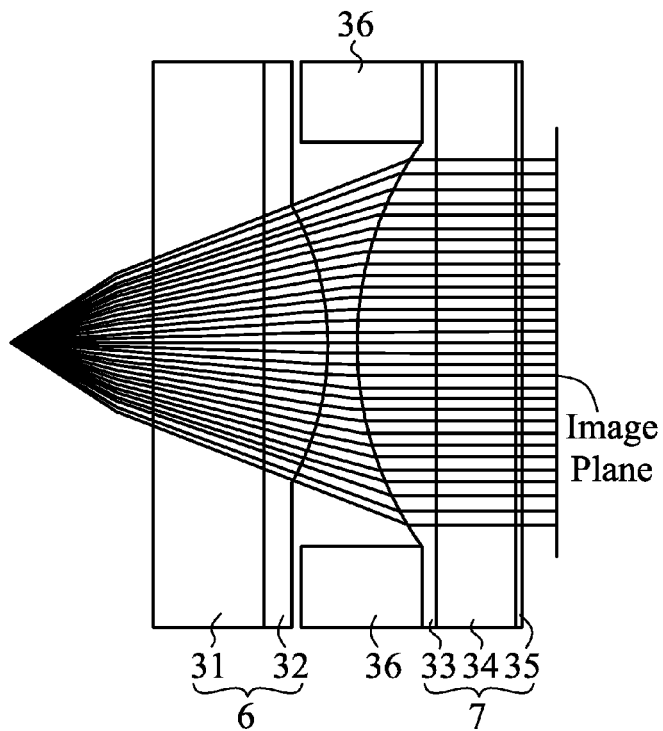
FIG. 3B shows an exemplary ray diagram of FIG. 3A.

FIG. 3A shows a lens arrangement of a collimating lens 300 according to a third embodiment of the present invention, and FIG. 3B shows an exemplary ray diagram of FIG. 3A.

In the third embodiment, the collimating lens 300 may include a first lens group 6 and a second lens group 7 in the order from the object side to the image side. Specifically, the first lens group 6 may include, in the order from the object side to the image side, a flat first lens 31 and a positive-powered second lens 32. To be more specific, the flat first lens 31 has a planar object-side surface m1 and a planar image-side surface m2. The positive-powered second lens 32 has a planar object-side surface m2 and an aspherical convex image-side surface m3 (with a positive radius). In the embodiment, the flat first lens 31 is in substantially contact with the positive-powered second lens 32.

The second lens group 7 may include, in the order from the object side to the image side, a positive-powered third lens 33, a flat fourth lens 34, and a flat diffraction fifth lens 35. To be more specific, the positive-powered third lens 33 has an aspherical convex object-side surface m4 (with a positive radius) and a planar image-side surface m5. The flat fourth lens 34 has a planar object-side surface m5 and a planar image-side surface m6. The flat diffraction fifth lens 35 has a planar object-side surface m6 and a planar image-side surface m7. In the embodiment, the positive-powered third lens 33 is in substantially contact with the flat fourth lens 34, which is in substantially contact with the flat diffraction fifth lens 35.

The collimating lens 300 of the third embodiment may further include a ring spacer 36, which is disposed between and in contact with peripheries of the first lens group 6 and the second lens group 7, such that the first lens group 6 may be coupled with the second lend group 7.

Generally speaking, the collimating lens 300 of the embodiment has at least two aspherical surfaces. For example, the collimating lens 300 has the aspherical convex image-side surface m3 and the aspherical convex object-side surface m4.

According to one aspect of the embodiment, the positive-powered second lens 32, the positive-powered third lens 33 and the flat diffraction fifth lens 35 have a refractive index ranging between 1.5 and 1.6, and have an Abbe number ranging between 31 and 48.

According to another aspect of the embodiment, the flat first lens 31 and the flat fourth lens 34 have a refractive index ranging between 1.5 and 1.6, and have an Abbe number ranging between 45 and 65.

According to the embodiments discussed above, a collimating lens with reduced dimension may be made by wafer-level optics (WLO) technique at low cost. Moreover, the collimating lens of the embodiments possesses no convex outer surface, thereby facilitating the assembly of the collimating lens.

Moreover, as the flat diffraction lens (19, 25 or 35) has a planar image-side surface (s12, t7 or m7), on which a diffractive optical elements (DOEs) pattern (not shown) may be directly formed, an additional glass plate as in the conventional art is thus not required and may be omitted, thereby reducing the thickness of the collimating lens.

The aspheric surface (e.g., s1, s4, s5, s8, s9, t3, t4, m3 or m4) may be defined by the following equation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where z is a distance from a vertex of lens in an optical axis direction, r is a distance in the direction perpendicular to the optical axis, c is a reciprocal of radius of curvature on vertex of lens, k is a conic constant and $\alpha_1$ to $\alpha_8$ are aspheric coefficients.

Although specific embodiments have been illustrated and described, it will be appreciated by those skilled in the art that various modifications may be made without departing from the scope of the present invention, which is intended to be limited solely by the appended claims.

What is claimed is:
1. A collimating lens, comprising:
   at least two lens groups, each having an aspherical surface; and
   a flat diffraction lens arranged in one of the at least two lens groups, and the flat diffraction lens disposed nearest to an image plane;

wherein one aspherical surface of the at least two lens groups has a positive radius, and another aspherical surface of the at least two lens groups has a negative radius.

2. The collimating lens of claim 1, wherein the at least two lens groups are composed of a plurality of lens having a refractive index ranging between 1.5 and 1.6, and the flat diffraction lens has a refractive index ranging between 1.5 and 1.6.

3. The collimating lens of claim 1, wherein the at least two lens groups comprise at least one positive-powered lens or at least one negative-powered lens having an Abbe number ranging between 31 and 48, and the flat diffraction lens has an Abbe number ranging between 31 and 48.

4. The collimating lens of claim 1, wherein the at least two lens groups comprise a plurality of flat lens having an Abbe number ranging between 45 and 65.

5. The collimating lens of claim 1 possesses no convex outer surface.

6. A collimating lens, comprising:
a first lens group, a second lens group and a third lens group disposed in an order from an object side to an image side, each of the first lens group and the third lens group having an aspherical surface; and
a flat diffraction lens arranged in the third lens group and disposed nearest to an image plane;
wherein the aspherical surface of the first lens group has a positive radius, and the aspherical surface of the third lens group has a negative radius.

7. A collimating lens, comprising:
a first lens group, a second lens group and a third lens group disposed in an order from an object side to an image side, each of the first lens group and the third lens group having an aspherical surface; and
a flat diffraction lens arranged in the third lens group and disposed nearest to an image plane;
wherein the first lens group includes a negative-powered first lens, a flat second lens and a positive-powered third lens in the order from the object side to the image side; the second lens group includes a negative-powered fourth lens, a flat fifth lens and a positive-powered sixth lens in the order from the object side to the image side; and the third lens group includes a positive-powered seventh lens, a flat eighth lens and the flat diffraction lens in the order from the object side to the image side.

8. The collimating lens of claim 7, wherein the negative-powered first lens has an aspherical concave object-side surface and a planar image-side surface; the flat second lens has a planar object-side surface and a planar image-side surface; the positive-powered third lens has a planar object-side surface and an aspherical convex image-side surface; the negative-powered fourth lens has an aspherical concave object-side surface and a planar image-side surface; the flat fifth lens has a planar object-side surface and a planar image-side surface; the positive-powered sixth lens has a planar object-side surface and an aspherical convex image-side surface; the positive-powered seventh lens has an aspherical convex object-side surface and a planar image-side surface; the flat eighth lens has a planar object-side surface and a planar image-side surface; and the flat diffraction lens has a planar object-side surface and a planar image-side surface.

9. The collimating lens of claim 8, wherein the aspherical concave object-side surface of the negative-powered first lens has a negative radius, the aspherical concave object-side surface of the negative-powered fourth lens has a negative radius, and the aspherical convex object-side surface of the positive-powered seventh lens has a positive radius.

10. The collimating lens of claim 7, wherein the negative-powered first lens, the positive-powered third lens, the negative-powered fourth lens, the positive-powered sixth lens, the positive-powered seventh lens and the flat diffraction lens have a refractive index ranging between 1.5 and 1.6, and have an Abbe number ranging between 31 and 48.

11. The collimating lens of claim 7, wherein the flat second lens, the flat fifth lens and the flat eighth lens have a refractive index ranging between 1.5 and 1.6, and have an Abbe number ranging between 45 and 65.

* * * * *